US008696136B2

(12) United States Patent
Achtenhagen et al.

(10) Patent No.: US 8,696,136 B2
(45) Date of Patent: Apr. 15, 2014

(54) REAR PROJECTION DISPLAY USING LASER EXCITED PHOTOLUMINESCENCE

(75) Inventors: Martin Achtenhagen, Plano, TX (US); Cheryl Achtenhagen, legal representative, Plano, TX (US); Preston P. Young, Arlington, TX (US); John Edward Spencer, Plano, TX (US)

(73) Assignee: Photodigm, Inc., Richardson, TX (US)

(*) Notice: Subject to any disclaimer, the term of this patent is extended or adjusted under 35 U.S.C. 154(b) by 90 days.

(21) Appl. No.: 13/284,517

(22) Filed: Oct. 28, 2011

(65) Prior Publication Data

US 2012/0195021 A1 Aug. 2, 2012

Related U.S. Application Data

(63) Continuation of application No. PCT/US2010/032996, filed on Apr. 29, 2010.

(60) Provisional application No. 61/173,860, filed on Apr. 29, 2009.

(51) Int. Cl.
*G03B 21/14* (2006.01)

(52) U.S. Cl.
USPC ................ 353/31; 353/94; 359/247; 359/242

(58) Field of Classification Search
USPC .......... 353/31, 79, 84, 30; 359/443, 449, 459, 359/237, 342, 247, 248, 267; 345/36-40, 345/45, 55, 76; 348/744, 760, 800, 817
See application file for complete search history.

(56) References Cited

U.S. PATENT DOCUMENTS

| | | | | |
|---|---|---|---|---|
| 6,501,590 | B2 * | 12/2002 | Bass et al. | 359/326 |
| 6,900,916 | B2 * | 5/2005 | Okazaki et al. | 359/202.1 |
| 6,986,581 | B2 * | 1/2006 | Sun et al. | 353/31 |
| 7,090,355 | B2 * | 8/2006 | Liu et al. | 353/79 |
| 7,537,346 | B2 * | 5/2009 | Liu et al. | 353/31 |
| 8,384,625 | B2 * | 2/2013 | Hajjar et al. | 345/75.1 |
| 2004/0070551 | A1 * | 4/2004 | Walck et al. | 345/7 |
| 2005/0174635 | A1 * | 8/2005 | Bruegl et al. | 359/443 |

FOREIGN PATENT DOCUMENTS

| | | |
|---|---|---|
| KR | 2002-0024408 A | 3/2002 |
| WO | WO 95/20811 | 8/1995 |

OTHER PUBLICATIONS

Dwivedi., Y, et al., "Intense white upconversion emission in Pr/Er/Yb codoped tellurite glass," Journal of Applied Physics, 104, 043509, 2008, pp. 043509-1 to 043509-4.

* cited by examiner

*Primary Examiner* — William C Dowling
(74) *Attorney, Agent, or Firm* — Slater & Matsil, L.L.P.

(57) ABSTRACT

A display system includes an optical light source and a display panel with an array of optically excitable pixels. Optics are positioned between the optical light source and the display panel so as to direct light from the optical light source toward the display panel to cause the optically excitable pixels to emit a visible image.

21 Claims, 3 Drawing Sheets

REAR PROJECTION DISPLAY USING LASER EXCITED PHOTOLUMINESCENCE

This application is a continuation of co-pending International Application No. PCT/US2010/032996, filed Apr. 29, 2010, which claims the benefit of U.S. Provisional Application No. 61/173,860, entitled "Rear Projection Display using Laser Excited Photoluminescence," filed on Apr. 29, 2009, both of which are incorporated herein by reference.

TECHNICAL FIELD

The present invention relates generally to displays and, in particular embodiments, to a rear projection display using laser excited photoluminescence.

BACKGROUND

A conventional CRT display uses a raster scanned electron beam to excite individual phosphors on a screen. A plasma display uses individually addressed cells in which an electric discharge (plasma) is used to excite a red, green, or blue phosphor. The plasma display generates images of exceptional saturation and brightness but suffers from poor energy efficiency relative to other display technologies. An LCD display uses individually addressed light valves to deliver red, green, or blue illumination to each pixel from a backlight. Each of these technologies uses a means to illuminate an individual subpixel within an image.

A MEMS device uses individually addressed mirrors or transmissive elements to project the pixels on the display surface. In one embodiment, the entire MEMS device is illuminated sequentially with either red, green or blue, and individual pixels are addressed to project a specific color pattern. The illumination source can either be white light, such as from a high pressure gas discharge source; red, green, and blue LEDs; or red, green, and blue lasers.

The MEMS device is generally much more energy efficient than other technologies, and is highly cost effective in larger screen sizes. However, lower manufacturing costs have favored the LCD technology in the most popular screen sizes.

SUMMARY OF THE INVENTION

In one aspect, the present invention provides a novel display technology using a scanning infrared laser to excite individual red, green, and blue subpixels in a rear projection architecture.

In a first embodiment, a display system includes an optical light source, such as a laser, and a display panel with an array of optically excitable pixels. Optics are positioned between the optical light source and the display panel so as to direct light from the optical light source toward the display panel to cause the optically excitable pixels to emit a visible image.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a rear projection display, such as for a television. The invention may also be applied, however, to other display systems.

Figure 1:
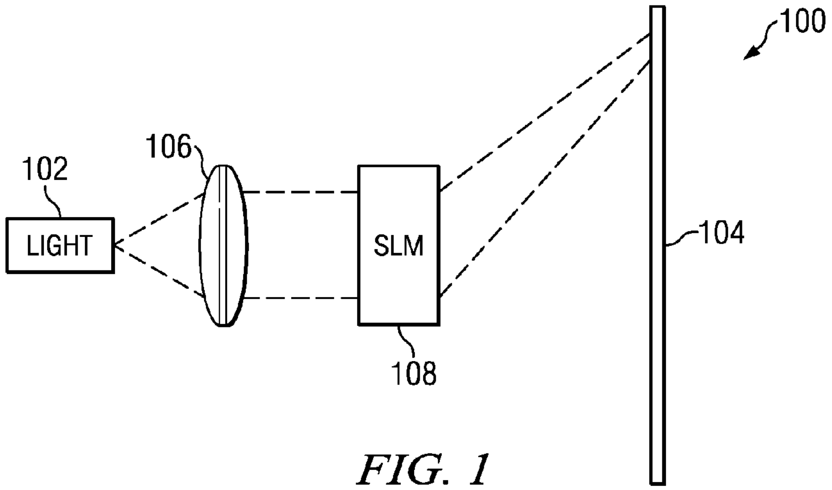
FIG. 1 is a block diagram of a first embodiment architecture.

One embodiment of the architecture is shown in FIG. 1. Referring to this figure, a display system 100 includes an optical light source 102 and a display panel 104 that includes an array of optically excitable pixels. Optics 106/108 are positioned between the optical light source 102 and the display panel 104 so as to direct light from the optical light source 102 toward the display panel 104 to cause the optically excitable pixels to emit a visible image. In one example, the optics includes a lens 106 and a spatial light modulator 108, which may be a MEMS device such as a digital micromirror device (DMD). A display comprising a matrix of individually addressed optically pumped solid state lasers in an area display panel that includes a plurality of subpixels, wherein each individual subpixel is associated with a plurality of lasers that are capable of generating a visible spectrum of light. The optical light source 102 is preferably a laser.

In a preferred embodiment, the display panel 104 includes a display surface that is composed of a rare earth containing glass, such as Pr:Yb that exhibits red, green, and blue fluorescence simultaneously, depending on the composition of the glass and ratios of rare earths in the glass. One example of a material with such properties is described in Dwivedi, et al., "Intense white upconversion emission in Pr/Er/Yb codoped tellurite glass," Journal of Applied Physics 104. 043509 (2008), four pages.

Figure 2:
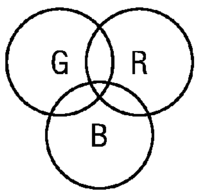
FIG. 2 is an illustration of subpixels of a pixel.

Individual subpixels are produced by red, green, and blue filters that pass only the fluorescence of the desired wavelength. One possible arrangement of the filters is shown in FIG. 2. By directing the laser beam by means of the MEMS device 108 sequentially to the appropriate subpixels, an image is produced on the display panel or screen 104.

While, the subpixels are described as being the primary colors, it is understood that the complementary colors could alternatively be used. In addition, a white, e.g., unfiltered or transparent, subpixel could be included to increase the brightness of the display.

In another embodiment, conventional glass is used, and individual red, green, and blue phosphors are applied to individual red, green, and blue subpixels so that the laser beam can individually and sequentially address each subpixel to produce the desired image.

The wavelength of the laser to be used will depend on the phosphor. For example, Pr:Yb can be excited to produce red, green, and blue using one or more infrared lasers. Other embodiments will be individual phosphors optimized for each color. The laser can be used with either an upconversion phosphor (e.g., two photons of infrared light to produce visible colors) or downconversion (e.g., excitation wavelength shorter than the fluorescence). If one or more infrared lasers are used to excite photoluminescence, the process is upconversion. On the other hand, if the laser is of shorter wavelength than the red, green, or blue, then it is downconversion. The optimum will be determined by minimizing the quantum defect for the system as well as maximizing the photoluminescence efficiency. By increasing the number of subpixels beyond three, a false color hyperspectral image could also be displayed, or the gamut in the visible could be increased.

The system can operate in a number of modes. For subtractive color formation, an infrared laser excites a rare earth doped host material (such as Er/Pr/Yb co-doped glass) to produce white light. Each pixel is composed of individual red, green, and blue subpixels formed by filters. As discussed above, a white subpixel could also be included. The color filters subtract the unwanted portions of the white light to produce the individual RGB. The spatial light modulator (SLM) directs the exciting laser beam to the appropriate subpixel.

Figure 3:
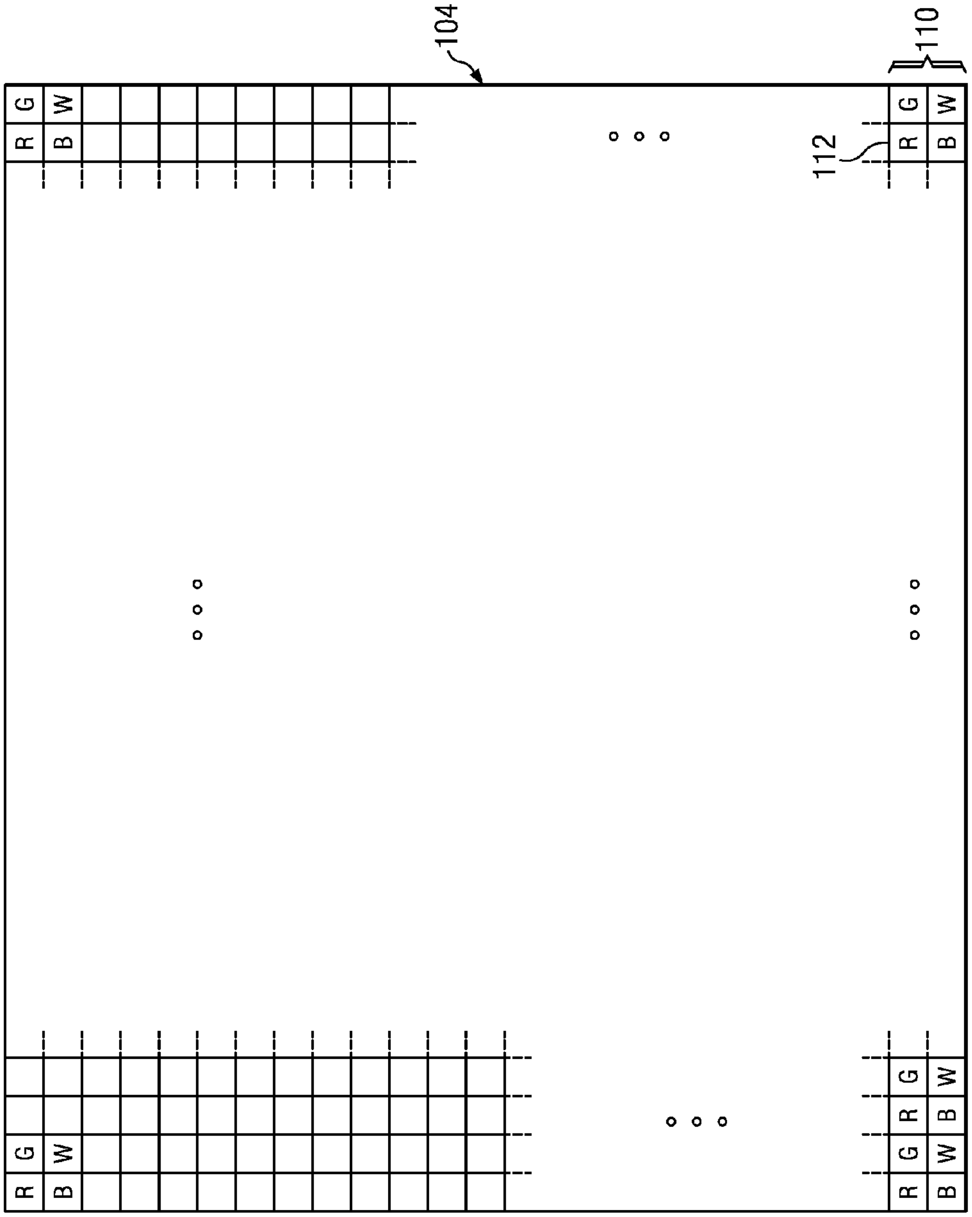
FIG. 3 is a view of one embodiment display panel.

An example of a display panel 104 is shown in FIG. 3. As shown in the figure, the display panel includes an array of pixels 110. Preferably, each pixel 110 includes a plurality of subpixels 112. As shown in FIG. 2, the subpixels can be formed by red, green and blue color filters. FIG. 3 shows an alternate embodiment where each pixel 110 includes a 2×2 array of subpixels that are red, green, blue and white. Other configurations of subpixels are also possible. The number of pixels in the array is a matter of design choice. Standard definition television would include 640×480 pixels, while high definition television would include either 1280×720 or 1920×1080 pixels. Any other number is also allowed.

In one example, the subpixels are excited by light reflected (or transmitted) by a spatial light modulator. For example, a DMD could include at least two rows, each with twice as many minors as there are subpixels in a row. The display panel 104 could then be imaged one row at a time. In an alternate embodiment, each DMD row could include less than all the subpixels and the light beam could be moved to alternately illuminate different color sets.

In direct color formation, each pixel has red, green and blue subpixels. The laser light is directed to the appropriate subpixel by a SLM, which is composed of a phosphor designed to emit at the appropriate color under IR laser excitation. This requires an upconversion phosphor. The fluorescence can also be excited by downconversion, where a blue or UV laser is used to excite a phosphor. Fluorescent lamps and plasma display panels use UV photon excitation of phosphors to excite red, green, and blue emission.

Figure 4:
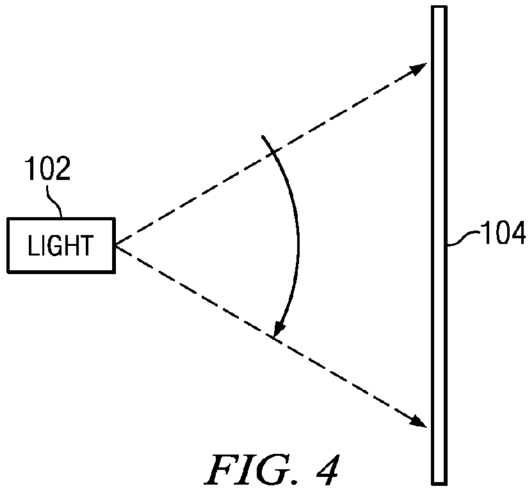
FIG. 4 is a block diagram of a first embodiment architecture.

In another example, laser 102 is scanned in a manner similar to a cathode ray tube. This embodiment is illustrated in FIG. 4. Each row of pixels (subpixels) can be excited as the laser is scanned across each row one by one (or more than one at a time if multiple lasers are used).

Figure 5:
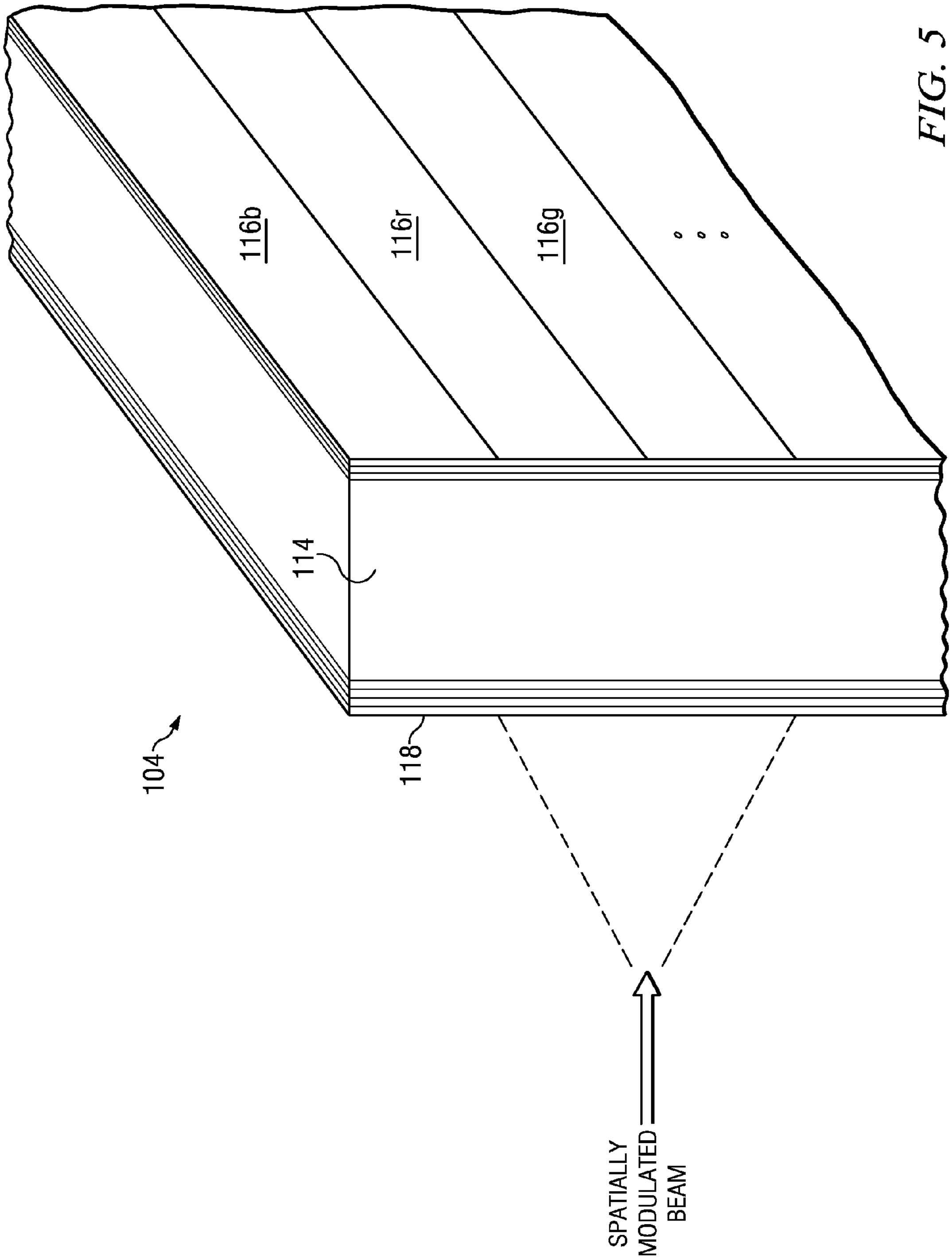
FIG. 5 is a view of a second embodiment display panel.

FIG. 5 illustrates a perspective view of another embodiment display panel 104. In this embodiment, the display panel includes glass or crystal panels. In fact, any transparent material can be used. In one preferable embodiment, the rare earth materials can be incorporated into the glass substrate 114 as part of the composition of the glass to create a rare-earth co-doped host. For example, the rare earth doped host material may be erbium doped praseodymium glass or ytterbium doped praseodymium glass.

In this embodiment, the color filters are incorporated as strips 116 along the panel 104. In one example, the strip **116*b* has a high reflection for blue, the strip 116*r* has a high reflection for red and the strip 116*g* has a high reflection for green. These strips can be excited, for example, by a spatially modulated beam or by a scanned laser that is turned off and on as it traverses each color row 116*b*, *r* or *g*. In addition, a broad band high reflection layer 118 is formed on a back surface of the substrate 114** to direct the photoluminescence forward. This layer is preferably transparent to the wavelength of the impinging light, e.g., transparent for infrared when an infrared laser is used.

The previous embodiment describes a white phosphor that is filtered to absorb the undesired primary colors and to let the desired primary color through. While this embodiment can have advantages, it can also be inefficient. In other embodiments, each subpixel (e.g., laser or phosphor) produces the desired primary, which leads to a more efficient solution.

Another embodiment includes a matrix of individually addressed optically pumped solid state lasers in a large area display panel, where each individual subpixel is a red, green, or blue laser. This embodiment can be envisioned with reference to FIG. 5, where the lasers would be formed adjacent to the layer 118 on the backside of the display 104. In a preferred embodiment, the broad band reflector layer 118 is an integral part of the laser pixel and the front side of the display could include a subpixel arrangement. The four-subpixel arrangement of FIG. 3, the three-subpixel arrangement of FIG. 2, or any other arrangement could be used.

In the preferred embodiment, the display panel is a Yb:Er:Pr glass with a broad band high reflectivity coating on the back side. It is understood that other rare-earth dopants could alternatively be used. The backside coating 118 is highly reflective for red, green, and blue, but is transmissive for IR. The IR from the pump laser is directed to the individual subpixels on the glass. Each subpixel forms a resonant cavity by having a front side coating with partial reflectivity for either R, G, or B, and transmissive for the other two colors. Directing the IR to the subpixel causes resonant emission (lasing) at the desired color. Each laser therefore provides an individual color pixel for a digital picture.

This embodiment would have one laser per subpixel. In other words, a full HD display would include several million lasers (e.g., 1920×1080=2,073,600 pixels×3 subpixels/pixel=6,220,800 subpixels). A fourth subpixel would increase the number proportionately. In this case, the display panel with solid state laser subpixels would be made monolithically using semiconductor fabrication techniques, and would include the glass substrate containing the rare earth ions and cavities defined by the front and rear surface minors.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A display system comprising:

an optical light source;

a display panel comprising an array of optically excitable pixels; and optics positioned between the optical light source and the display panel so as to direct light from the optical light source toward the display panel to cause the optically excitable pixels to emit a visible image, wherein each pixel comprises a plurality of subpixels, each subpixel forming a resonant cavity by having a front side coating with high reflectivity for a first color and high transmissivity of a second color and a third color, so as to form a resonant cavity for the first color and emit light of the first color.

2. The system of claim 1, wherein the visible image is emitted via photoluminescence.

3. The system of claim 1, wherein the optical light source comprises a laser.

4. The system of claim 1, wherein the display panel comprises a rare earth doped layer.

5. The system of claim 4, wherein the display panel comprises a Pr/Er/Yb layer.

6. The system of claim 1, wherein the optics comprises a spatial light modulator.

7. The system of claim 1, wherein the display panel comprises a rare earth glass with a broad band high reflectivity coating on a back side.

8. The system of claim 7, wherein the coating is highly reflective for visible light but is transmissive for infrared light.

9. The system of claim 8, wherein the optics comprises a spatial light modulator and wherein the optical light source comprises a pump laser that generates light that is directed to the optically excitable pixels by the spatial light modulator.

10. The display system of claim 1, wherein the first, second, and third colors are selected from red, green, and blue such that when the first color is red, the second and third colors are green and blue, when the first color is green, the second and third colors are red and blue, and when the first color is blue, the second and third colors are red and green.

11. A display system comprising:

an optical light source; and a display panel comprising an array of optically excitable pixels, wherein each optically excitable pixel comprises a plurality of individual subpixels, each subpixel comprising an optically pumped laser, and wherein the optical light source is positioned to direct light toward the display panel to cause the optically excitable pixels to emit a visible image.

12. The system of claim 11, wherein the optical light source comprises two lasers that both generate light with a wavelength between 800 nm and 1000 nm such that visible light is generated by an upconversion process.

13. The system of claim 11, wherein the optical light source comprises a blue laser.

14. The system of claim 11, wherein the display panel comprises a rare earth layer.

15. The display system of claim 11, wherein the optical light source is a scanning optical light source and wherein each of the individual subpixels is a red, green, or blue laser.

16. A display system comprising:

a display panel that includes an array of pixels, each pixel comprising a region of rare earth material, a plurality of color filters, and a plurality of subpixels, wherein each subpixel forms a resonant cavity by having a front side coating with high reflectivity for a first color and high transmissivity of a second color and a third color, so as to form a resonant cavity for the first color and emit light of the first color; and a laser positioned to direct light toward the display panel, the laser being scanned or spatially modulated.

17. A display comprising:

a display panel that includes a plurality of pixels, each pixel including a plurality of subpixels; and a matrix of individually addressed optically pumped gain guided solid state lasers in the display panel, wherein each individual subpixel is associated with a laser that is capable of generating a color of light such that all subpixels of each pixel can generate a visible spectrum of light.

18. The display of claim 17, wherein each subpixel is associated with a red, green or blue laser.

19. The display of claim 17, wherein the display panel comprises a glass panel with rare earth materials incorporated as part of the composition of the glass.

20. The display of claim 19, wherein the glass panel includes a broad band high reflectivity coating on a back side of the panel, the coating being reflective for visible light but transmissive for infrared light.

21. The display of claim 17, wherein each subpixel has a coating of high reflectivity for a first color among green, red, or blue and high transmissivity for the colors among green, red and blue that are not the first color, so that resonant emission occurs for the first color.

* * * * *